(12) United States Patent
Chae et al.

(10) Patent No.: US 9,417,491 B2
(45) Date of Patent: Aug. 16, 2016

(54) LIQUID CRYSTAL DISPLAY

(71) Applicant: Samsung Display Co., Ltd., Yongin, Gyeonggi-Do (KR)

(72) Inventors: Soo Jung Chae, Seoul (KR); Sung Man Kim, Seoul (KR); Min-Chul Song, Cheonan-si (KR); Hwa Yeul Oh, Seoul (KR); Young Je Cho, Asan-si (KR); Hyun Ki Hwang, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/460,064

(22) Filed: Aug. 14, 2014

(65) Prior Publication Data

US 2015/0062472 A1     Mar. 5, 2015

(30) Foreign Application Priority Data

Aug. 27, 2013  (KR) .................. 10-2013-0101832

(51) Int. Cl.
*G02F 1/1343* (2006.01)
*G02F 1/1337* (2006.01)
(52) U.S. Cl.
CPC .... *G02F 1/134363* (2013.01); *G02F 1/133707* (2013.01); *G02F 2001/134318* (2013.01)
(58) Field of Classification Search
CPC .................. G02F 1/134363; G02F 1/133707; G02F 2001/134318
See application file for complete search history.

(56) References Cited

U.S. PATENT DOCUMENTS

| | | | |
|---|---|---|---|
| 8,154,696 B2 | 4/2012 | Song et al. | |
| 8,289,489 B2 | 10/2012 | Im et al. | |
| 8,294,857 B2 | 10/2012 | Lee et al. | |
| 8,294,864 B2 | 10/2012 | Itou | |
| 2011/0109861 A1 | 5/2011 | Son et al. | |
| 2012/0218501 A1* | 8/2012 | Lee ................... G02F 1/134309 349/139 |
| 2013/0188116 A1* | 7/2013 | Jeon ............................ 349/106 |

FOREIGN PATENT DOCUMENTS

| | | |
|---|---|---|
| JP | 2011-017891 | 1/2011 |
| KR | 10-0590932 | 6/2006 |
| KR | 10-2007-0023248 | 2/2007 |
| KR | 10-0975470 | 8/2010 |

* cited by examiner

*Primary Examiner* — Donald Raleigh
(74) *Attorney, Agent, or Firm* — Innovation Counsel LLP

(57) ABSTRACT

A display device may include an insulating layer. The display device may further include a first field-generating electrode that overlaps the insulating layer. The display device may further include a second field-generating electrode that overlaps the first field-generating electrode and has a cutout. An exposed portion of the insulating layer may be exposed through the cutout and may be exposed between an edge (or boundary) of the first field-generating electrode and an end portion of the second field-generating electrode in a layout view of the display device.

20 Claims, 7 Drawing Sheets

LIQUID CRYSTAL DISPLAY

CROSS-REFERENCE TO RELATED APPLICATION

This application claims priority to and the benefit of Korean Patent Application No. 10-2013-0101832 filed in the Korean Intellectual Property Office on Aug. 27, 2013, the entire contents of which are incorporated herein by reference.

BACKGROUND (a) Technical Field

The present invention relates to a liquid crystal display device, or liquid crystal display, for conciseness.

(b) Description of the Related Art

A liquid crystal display may include a pixel electrode in each pixel, a common electrode, and a liquid crystal layer. Arrangement of liquid crystal molecules of the liquid crystal layer may be controlled by applying voltages to the pixel electrode and the common electrode, such that light transmitted by the liquid crystal layer may be controlled and that desirable images can be displayed by the liquid crystal display.

For providing a wide viewing angle, the pixel electrode and the common electrode may be formed on a same substrate, and at least one of the pixel electrode and the common electrode may have a plurality of cutouts and may have a plurality of branch electrodes defined by the plurality of cutouts. According to this configuration, irregular movement of the liquid crystal molecules may occur at ends of the cutouts and may move to a central region of the pixel along the cutouts. As a result, transmittance of the liquid crystal display may be undesirably reduced.

The above information disclosed in this Background section is for enhancement of understanding of the background of the invention. The Background section may contain information that does not form the prior art that is already known in this country to a person of ordinary skill in the art.

SUMMARY

Embodiments of the present invention may be related to display device (e.g., a liquid crystal display) that has minimum deterioration of transmittance potentially caused by irregular movement of liquid crystal molecules.

An embodiment of the present invention may be related to a display device (e.g., a liquid crystal display) that may include an insulating layer. The display device may further include a first field-generating electrode (e.g., a pixel electrode or a common electrode) that overlaps the insulating layer. The display device may further include a second field-generating electrode (e.g., a common electrode or a pixel electrode) that overlaps the first field-generating electrode and has a cutout. An exposed portion of the insulating layer may be exposed through the cutout and may be exposed between a first edge (or first boundary) of the first field-generating electrode and an end portion of the second field-generating electrode in a layout view of the display device.

The second field-generating electrode may include a first branch electrode and a second branch electrode. The cutout may be positioned between the first branch electrode and the second branch electrode. The exposed portion of the insulating layer may be exposed between the first branch electrode and the second branch electrode in the layout view of the display device.

An exposed portion of the first edge of the first field-generating electrode may be exposed through the cutout in the layout view of the display device. The second field-generating electrode may include a first branch electrode and a second branch electrode. The cutout may be positioned between the first branch electrode and the second branch electrode. The exposed portion of the first edge of the first field-generating electrode may be exposed between the first branch electrode and the second branch electrode in the layout view of the display device.

A second edge of the first field-generating electrode may be disposed opposite the first edge of the first field-generating electrode. An exposed portion of the second edge of the first field-generating electrode may be exposed through the cutout in the layout view of the display device.

The display device may include a data line configured to transmit a data signal. The cutout may include a first portion and a second portion. The first portion of the cutout may extend parallel to a portion of the data line. The second portion of the cutout may extend at a first acute angle with respect to the first portion of the cutout (and/or with respect to the portion of the data line). The exposed portion of the insulating layer may be exposed through the second portion of the cutout in the layout view of the display device.

The display device may include a gate line configured to transmit a gate signal. The second portion of the cutout may be disposed at an edge portion of a pixel area that is defined by the data line and the gate line.

The cutout may include a third portion. The first portion of the cutout may be connected between the second portion of the cutout and the third portion of the cutout. The third portion of the cutout may be disposed at a second acute angle with respect to the first portion of the cutout (and/or with respect to the portion of the data line). The display device may include a gate line configured to transmit a gate signal. The third portion of the cutout may be disposed at a central portion of a pixel area that is defined by the data line and the gate line.

The second field-generating electrode may have a plurality of cutouts. Exposed portions of the insulating layer may be exposed through the cutouts and may be exposed between the first edge of the first field-generating electrode and the end portion of the second field-generating electrode in the layout view of the display device. The exposed portions of the insulating layer may be aligned with each other in a direction parallel to an extension direction of the first edge of the first field-generating electrode. The exposed portions of the insulating layer may be exposed between branch electrodes of the second field-generating electrode in the layout view of the display device.

An embodiment of the present invention may be related to a display device (e.g., a liquid crystal display) that may include a first field-generating electrode. The display device may further include a second field-generating electrode that overlaps the first field-generating electrode and has a cutout. An exposed portion of a first edge of the first field-generating electrode may be exposed through the cutout in a layout view of the display device.

The exposed portion of the first edge of the first field-generating electrode may be positioned between two opposite edges of the cutout in the layout view of the display device.

The second field-generating electrode may include a first branch electrode and a second branch electrode. The cutout may be positioned between the first branch electrode and the second branch electrode. The exposed portion of the first edge of the first field-generating electrode may be exposed between the first branch electrode and the second branch electrode in the layout view of the display device.

A second edge of the first field-generating electrode may be disposed opposite the first edge of the first field-generating electrode. An exposed portion of the second edge of the first field-generating electrode may be exposed through the cutout in the layout view of the display device. Both the exposed portion of the first edge of the first field-generating electrode and the exposed portion of the second edge of the first field-generating electrode may be positioned between two opposite edges of the cutout in the layout view of the display device.

The display device may include a data line configured to transmit a data signal. The cutout may include a first portion and a second portion. The first portion of the cutout may extend parallel to a portion of the data line. The second portion of the cutout may extend at a first acute angle with respect to the first portion of the cutout (and/or with respect to the portion of the data line). The exposed portion of the first edge of the first field-generating electrode may be exposed through the second portion of the cutout in the layout view of the display device.

The display device may include a gate line configured to transmit a gate signal. The second portion of the cutout may be disposed at an edge portion of a pixel area that is defined by the data line and the gate line.

The second field-generating electrode may have a plurality of cutouts. Exposed portions of the first edge of the first field-generating electrode may be exposed through the cutouts in the layout view of the display device The cutouts may be positioned between branch electrodes of the second field-generating electrode in the layout view of the display device. The first edge of the first field-generating electrode may overlap the branch electrodes.

An embodiment of the present invention may be related to a liquid crystal display that may include the following elements: a first substrate; a gate line and a data line formed on the first substrate; a first field generating electrode formed on the first substrate; an insulating layer formed on the first field generating electrode; and a second field generating electrode formed on the insulating layer and having a plurality of cutouts. Each cutout of the plurality of cutouts includes a first portion extending substantially parallel to a portion of the data line and a second portion extending at a first acute angle with respect to the first portion. Exposed portions of an edge of the first field generating electrode that is adjacent to end portions of the cutouts are exposed by the second portions of the cutouts in a layout view of the liquid crystal display.

The second portion may be disposed at an edge of a pixel area defined by the gate line and the data line.

The plurality of cutouts may further include a third portion disposed at a second acute angle with respect to the first portion.

The third portion may be disposed at a central portion of the pixel area.

The first field generating electrode may have a plate planar shape formed throughout the pixel area.

According embodiments of the present invention, deterioration of transmittance of a liquid crystal display potentially caused by irregular movement of liquid crystal molecules may be substantially prevented or minimized

DETAILED DESCRIPTION OF THE EMBODIMENTS

Figure 1:
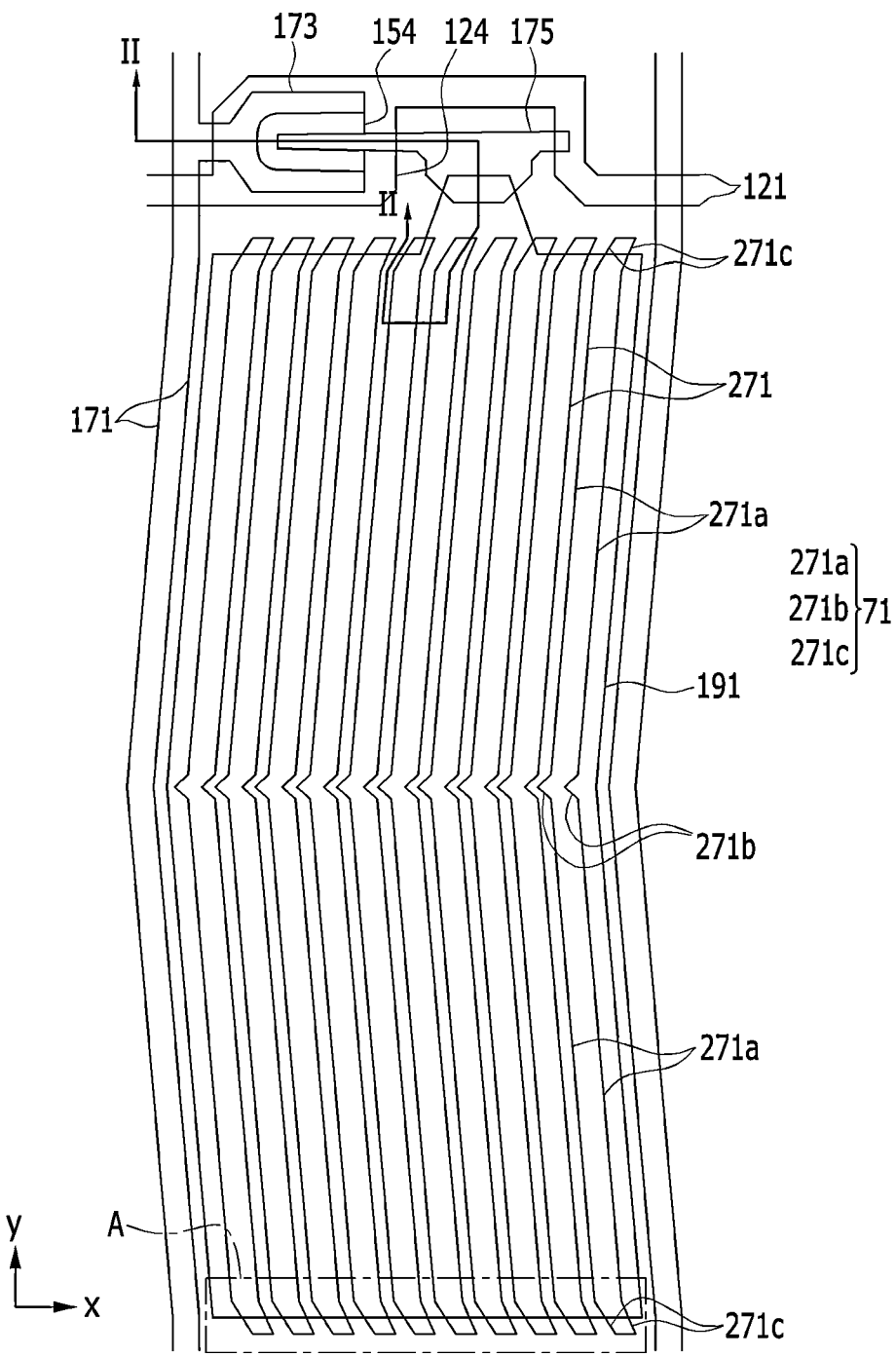
FIG. 1 is a layout view that illustrates display device (e.g., a liquid crystal display) according to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In the drawings, thicknesses of layers, films, panels, regions, etc., may be exaggerated for clarity. Like reference numerals may designate like elements in the specification. If an element, such as a layer, film, region, or substrate, is referred to as being "on" another element, it can be directly on the other element, or at least one intervening element may also be present. In contrast, if an element is referred to as being "directly on" another element, there are no intended intervening elements (except one or more environmental elements, such as air) present.

Although the terms "first", "second", etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer, or section. Thus, a first signal, element, component, region, layer, or section discussed below may be termed a second signal, element, component, region, layer, or section without departing from the teachings of the present invention. The description of an element as a "first" element may not require or imply the presence of a second element or other elements. The terms "first", "second", etc. may also be used herein to differentiate different categories of elements. For conciseness, the terms "first", "second", etc. may represent "first-type (or first-category)", "second-type (or second-category)", etc., respectively.

Figure 2:
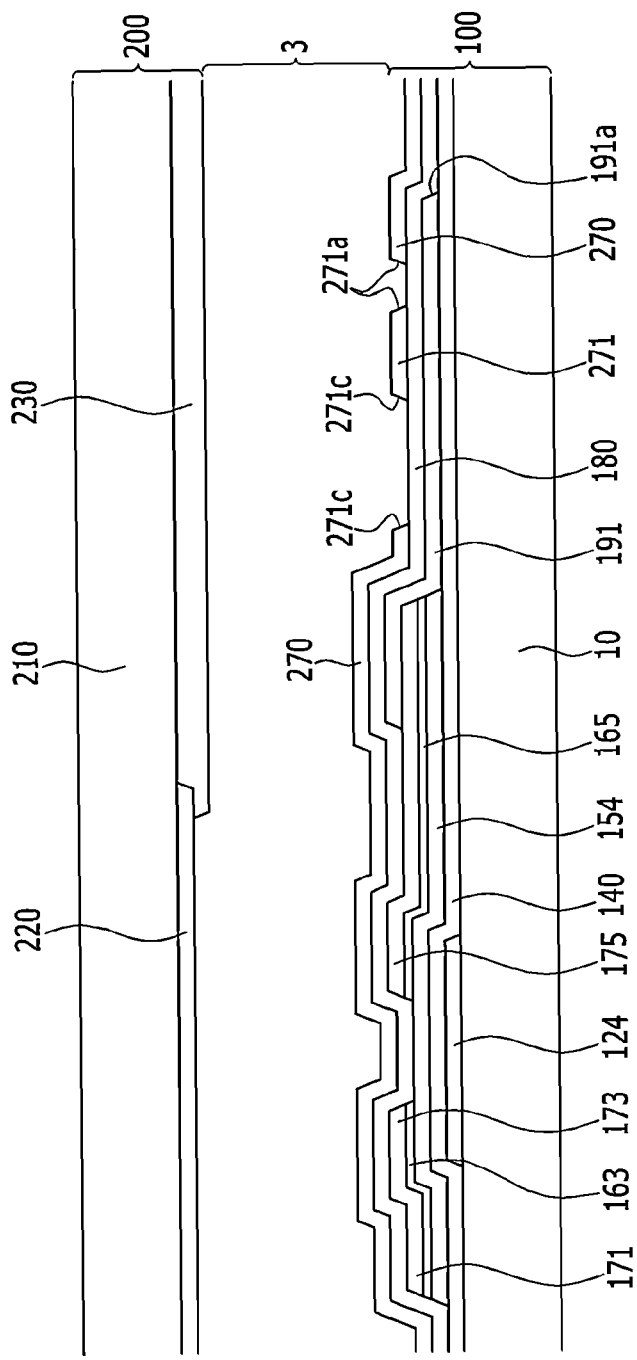
FIG. 2 is a cross-sectional view taken along line II-II indicated in FIG. 1 according to an embodiment of the present invention.
Figure 3:
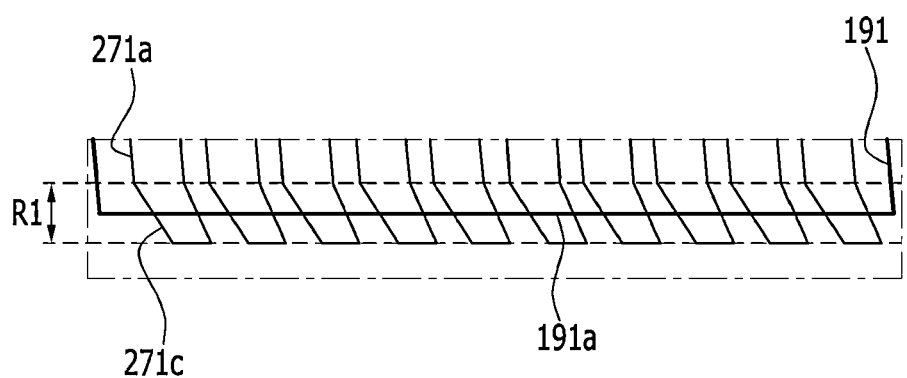
FIG. 3 is a layout view that illustrates a part A indicated in FIG. 1 according to an embodiment of the present invention.

FIG. 1 is a layout view that illustrates a display device (e.g., a liquid crystal display) according to an embodiment of the present invention. FIG. 2 is a cross-sectional view taken along line II-II indicated in FIG. 1 according to an embodiment of the present invention. FIG. 3 is a layout view that illustrates a part A indicated in FIG. 1 according to an embodiment of the present invention.

Referring to FIGS. 1 and 2, the liquid crystal display includes a lower panel 100 and an upper panel 200 facing each other, and a liquid crystal layer 3 interposed therebetween.

First, the lower panel 100 will be described.

A gate conductor including a gate line 121 is formed on a first insulation substrate 110 made of transparent glass or plastic.

The gate line 121 may include and/or may be connected to a gate electrode 124 and a gate pad (not illustrated) for connection with another layer and/or an external driving circuit.

The gate line 121 may be made of at least one of aluminum-based metal such as aluminum (Al) or an aluminum alloy, silver-based metal such as silver (Ag) or a silver alloy, copper-based metal such as copper (Cu) or a copper alloy, molybdenum-based metal such as molybdenum (Mo) or a molybdenum alloy, chromium (Cr), tantalum (Ta), and titanium (Ti). In an embodiment, the gate line 121 may have a multilayered structure including at least two conductive layers having different physical properties.

A gate insulating layer 140 made of silicon nitride (SiNx) and/or silicon oxide (SiOx) is formed on a gate conductor 121. The gate insulating layer 140 may have a multilayered structure including at least two insulating layers having different physical properties.

A semiconductor 154 made of amorphous silicon and/or polysilicon is formed on the gate insulating layer 140. The semiconductor 154 may include an oxide semiconductor.

Ohmic contacts 163 and 165 are formed on the semiconductor 154. The ohmic contacts 163 and 165 may be made of an n+ hydrogenated amorphous silicon (in which n-type impurity such as phosphorus is doped at high concentration) and/or silicide. The ohmic contacts 163 and 165 may be respectively disposed on two end portions of the semiconductor 154. In an embodiment, the semiconductor 154 may include an oxide semiconductor, and the ohmic contacts 163 and 165 may be omitted.

Data conductors, including a data line 171, a source electrode 173, and a drain electrode 175, are disposed on the ohmic contacts 163 and 165 and the gate insulating layer 140.

The data line 171 includes a data pad portion (not illustrated) for connection with another layer and/or an external driving circuit. Data lines 171 may transmit data signals and may cross gate lines 121.

In an embodiment, the data line 171 may have a curved portion, for maximizing transmittance of the liquid crystal display. The curved portion may have a V-lettered shape. The curved portion of the data line 171 may include a first portion and a second portion that meet in a middle region of a pixel area.

The first portion may be disposed at an angle of about 7° with respect to a vertical reference line (a reference line extending in a Y directions) that is disposed at an angle of 90° with respect to an extension direction (an X direction) of the gate line 121. The first portion may be disposed at an angle of about 83° with respect to the extension direction of the gate line 121. The second portion may be disposed at an angle in a range of about 7° to about 15° with respect to the first portion.

The gate electrode 124, the source electrode 173, and the drain electrode 175 form a thin film transistor (TFT) together with the semiconductor 154. A channel of the thin film transistor is disposed in the semiconductor 154 between portions of the semiconductor 154 that overlap the source electrode 173 and the drain electrode 175.

The data line 171, the source electrode 173, and/or the drain electrode 175 may be made of refractory metal such as at least one of molybdenum, chromium, tantalum, titanium, and an alloy of some of the materials. At least one of the data line 171, the source electrode 173, and the drain electrode 175 may have a multilayered structure that may include a refractory metal layer (not illustrated) and a low resistive conductive layer (not illustrated). In an embodiment, the multilayered structure may include a chromium or molybdenum (alloy) lower layer and an aluminum (alloy) upper layer. In an embodiment, the multilayered structure may include a molybdenum (alloy) lower layer, an aluminum (alloy) intermediate layer, and a molybdenum (alloy) upper layer. The data line 171, the source electrode 173, and the drain electrode 175 may be made of one or more of various metals and/or one or more non-metal conductors.

A pixel electrode 191 may directly contact both a portion of the drain electrode 175 and a portion of the gate insulating layer 140. The pixel electrode 191 may include a planar portion, that is, a plate portion, disposed in a pixel area.

A passivation layer 180 is disposed on the data conductors 171, 173, and 175, the gate insulating layer 140, and an exposed portion of the semiconductor 154, the pixel electrode 191. In an embodiment of the present invention, a passivation layer 180 may be disposed between a pixel electrode 191 and a data line 171, and the pixel electrode 191 may be connected to a drain electrode 175 through a contact hole (not illustrated) formed in the passivation layer 180.

Common electrodes 270 are formed on the passivation layer 180. The common electrodes 270 are connected to each other to receive a reference voltage from a reference voltage applying unit (not illustrated) disposed outside the display area. The liquid crystal display may further include a common voltage line (not illustrated), and the common electrode 270 is connected to the common voltage line to receive the common voltage. The common voltage line configuration may minimize signal delay of the common voltage.

A common electrode 270 has a plurality of cutouts 71 and includes a plurality of branch electrodes 271 defined by the plurality of cutouts 71.

A cutout 71 of the common electrode 270 may include two stem portions 271a, two central portions 271b, and two edge portions 271c. Each stem portion 271a may be substantially parallel to the first portion or the second portion of the data line 171. A central portion 271b may be disposed at a central portion of the pixel area, connected between the two stem portions 271a, and disposed at a first angle that has a predetermined size with respect to a stem portion 271a. An edge portion 271c may be disposed at an edge portion of the pixel area and may be disposed at a second angle that has a predetermined size with respect to a stem portion 271a. The size of the first angle and the size of the second angle may be different from each other. A first stem portion 271a may be connected between a first edge portion 271c and a first central portion 271b and may be parallel to the first portion of the data line 171. A second stem portion 271a may be connected between a second edge portion 271c and a second central portion 271b and may be parallel to the second portion of the data line 171. Both central portions 271b may be connected between the two stem portions 271a.

A stem portion 271a may be disposed at a first acute angle with respect to the extension direction of a gate line 121 (and/or with respect to the x-axis). A central portion 271b may be disposed at a second acute angle with respect to the extension direction of the gate line 121 (and/or with respect to the x-axis). An edge portion 271c may be disposed at a third acute angle with respect to the extension direction of the gate line 121 (and/or with respect to the x-axis). The first acute angle may be larger than the second acute angle. The first acute angle may be larger than the third acute angle. An acute angle between a vertical reference line (e.g., the y-axis) and a central portion 271b or an edge portion 271c of the cutout 71 of the common electrode 270 may be larger than an acute angle between the vertical reference line (e.g., the y-axis) and a stem portion 271a of the cutout 71 of the common electrode 270.

The two stem portion 271a of the cutout 71 of the common electrode 270 may have a combined length of about 80% or more of the entire length of the cutout 71. The two central portions 271b may have a combined length within about 10% of the entire length of the cutout 71. The two edge portions 271c may have a length within about 10% of the entire length of the cutout 71. The configuration may provide sufficient overlap between the pixel electrode 191 and the common electrode 270.

In an embodiment, an exposed portion of a first edge 191a (or first boundary 191a) of the pixel electrode 191 may overlap and/or exposed by an edge portion 271c of the cutout 71 at least in a layout view of the liquid crystal display, as illustrated in FIG. 1 and FIG. 3. The edge portion 271c may be disposed between two branch electrodes 271 of the common electrode 270 in the extension direction of the gate line 121. The first edge 191a (or first boundary 191a) of the pixel electrode 191 may overlap each of the two portions of the common electrode 270 at least in the layout view of the liquid crystal display. The exposed portion of the first edge 191a may not be covered by the common electrode 270 and may be exposed between the two branch electrodes 271 in the layout view of the liquid crystal display.

In contrast, in a conventional liquid crystal display, edges of a pixel electrode may surround cutouts of a common electrode in a layout view of the liquid crystal display and may not be exposed by the cutouts of the common electrode.

In an embodiment, an alignment layer (not illustrated) is coated on the common electrode 270 and the passivation layer 180. In an embodiment, the alignment layer may be a horizontal alignment layer and may be rubbed in a predetermined direction. In an embodiment, the alignment layer may include a photoreactive material configured to be photo-aligned.

Next, the upper panel 200 will be described.

A light blocking member 220 may be formed on a second insulation substrate 210. A plurality of color filters 230 may be formed on the second substrate 210. In an embodiment, the color filters 230 and/or the light blocking member 220 may be disposed on the first insulation substrate 10.

An overcoat (not illustrated) may be formed on the color filters 230 and the light blocking member 220. The overcoat may be omitted.

An alignment layer may be disposed on the overcoat.

The liquid crystal layer 3 may include a liquid crystal material that has positive dielectric anisotropy or negative dielectric anisotropy. Long axes of liquid crystal molecules of the liquid crystal layer 3 may be aligned to be parallel to the substrates 10 and 210. The liquid crystal molecules may be pre-tilted in at least one rubbing direction of at least one of the alignment layers.

In an embodiment, the liquid crystal molecules of the liquid crystal layer 3 may be pre-tilted in the y and/or at 90° with respect to the extension direction of the gate line 121.

In an embodiment, the common electrode 270 may have a planar shape formed throughout each pixel area, and the pixel electrode may have a plurality of branch electrodes defined by cutouts.

In an embodiment of the present invention, a cutout of a field generating electrode, such as the common electrode 270 or the pixel electrode 191, may include central portions 271b and edge portions 271c disposed at larger acute angles with respect to a vertical reference line than stem portions 271a, in addition to the stem portion 271a. The central portions 271b and the edge portions 271c are disposed at smaller acute angles with respect to a gate line extension direction than the stem portions 271a. That is, the cutout is additionally curved at its center and is additionally curved at its edges. The configuration with additional curves and different angles may substantially prevent potential irregular movement of the liquid crystal molecules at the central portions 271b and the edge portions 271c from undesirably dispersing to the stem portions 271a. Advantageously, the liquid crystal display may have satisfactory light transmittance. In contrast, a conventional liquid crystal display may not include the additional curves.

Referring to FIG. 3, the first edge 191a (or first boundary 191a) of the pixel electrode 191 may overlap and may be exposed by an edge portion 271c of the cutout 71 at least in a layout view of the liquid crystal display. The edge portion 271c may be disposed between two portions of the common electrode 270 in the extension direction of the gate line 121. The first edge 191a (or first boundary 191a) of the pixel electrode 191 may overlap each of the two portions of the common electrode 270 at least in the layout view of the liquid crystal display. The first edge 191a is positioned in a region R1 defined by boundaries of the edge portions 271c of the cutout 71. A dimension of the region R1 in the y direction (perpendicular to the gate line extension direction) is equal to a dimension of an edge portion 271c in the y direction.

In a conventional liquid crystal display, edges of a pixel electrode may be formed outside cutouts of a common electrode in a layout view of the liquid crystal display and/or may surround the cutouts of the common electrode 270 in the layout view of the liquid crystal display. The edges of the pixel electrode may not overlap or be exposed by the cutouts of the common electrode.

In the conventional liquid crystal display, a direction of a fringe field generated between an end portion of a cutout and a corresponding edge of the pixel electrode may be substantially different from a direction of a fringe field generated between a stem portion of the cutout and a corresponding portion of the pixel electrode. Therefore, substantial irregular movement of the liquid crystal molecules at to the end portion of the cutout may occur.

In contrast, according to an embodiment of the present invention, the first edge 191a may overlap and/or be exposed by edge portions 271c of cutout 71 without substantially overlapping electrode material portions of the common electrode 270. That is, overlap between end portions of the common electrode 270 and the pixel electrode 191 may be minimized. Therefore, irregular movement of liquid crystal molecules at the edge portions 271c of the cutout 71 may be minimized, and light transmittance consistency of the liquid crystal display may be optimized. Advantageously, image display quality of the liquid crystal display may be optimized.

Figure 4A:
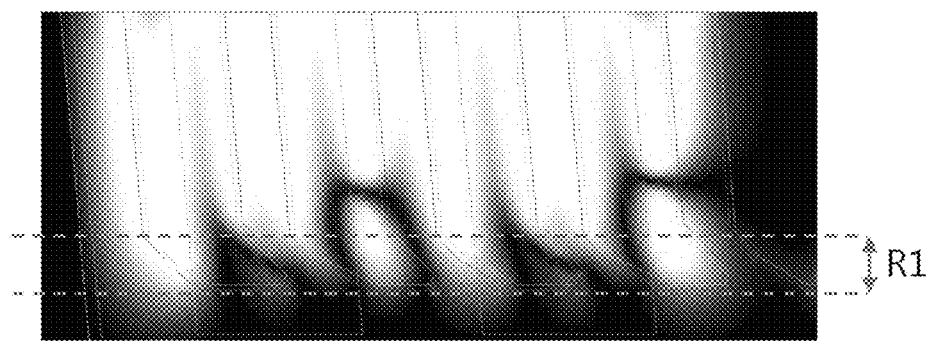
FIG. 4A is an electron micrograph that illustrates an experimental transmittance result related to a conventional liquid crystal display.

FIG. 4A is an electron micrograph that illustrates an experimental transmittance result related to a conventional liquid crystal display In the liquid crystal display, an edge of a first field-generating electrode (e.g., a pixel electrode) may be disposed outside cutouts of a second field-generating electrode (e.g., a common electrode) in a plan view of the liquid crystal display. As illustrated in FIG. 4A, deterioration of light transmittance may occur in the region R1 and may extend beyond the region R1. Given the configuration of the additional curves of the cutouts of the common electrode, the extension of the transmittance deterioration may be limited. Therefore, sufficient overall light transmittance may be provided.

Figure 4B:
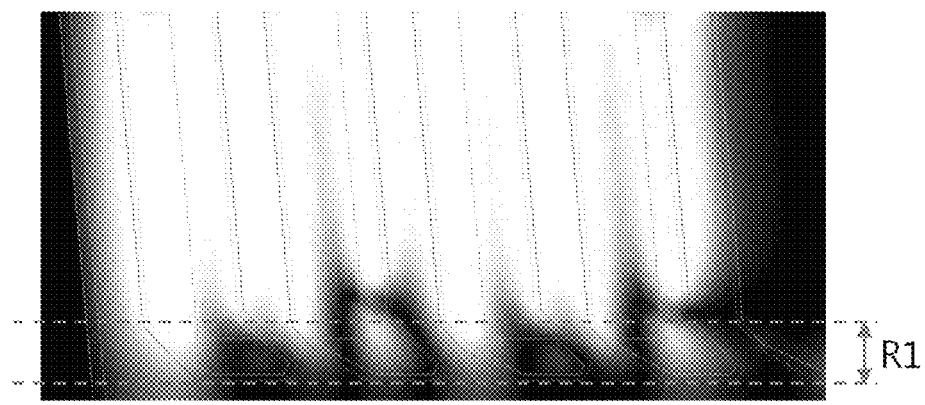
FIG. 4B is an electron micrograph that illustrates an experimental transmittance result related to a liquid crystal display according to an embodiment of the present invention.

FIG. 4B is an electron micrograph that illustrates an experimental transmittance result related to a liquid crystal display according to an embodiment of the present invention. In the liquid crystal display, an edge of a first field-generating electrode (e.g., a pixel electrode) may be exposed by edge portions of cutouts of a second field-generating electrode (e.g., a common electrode) in a plan view of the liquid crystal display. As illustrated in FIG. 4B, deterioration of light transmittance may be substantially limited to the region R1 without substantially extending beyond the region R1. Advantageously, overall light transmittance deterioration may be minimized, and satisfactory overall light transmittance may be provided.

Figure 5A:
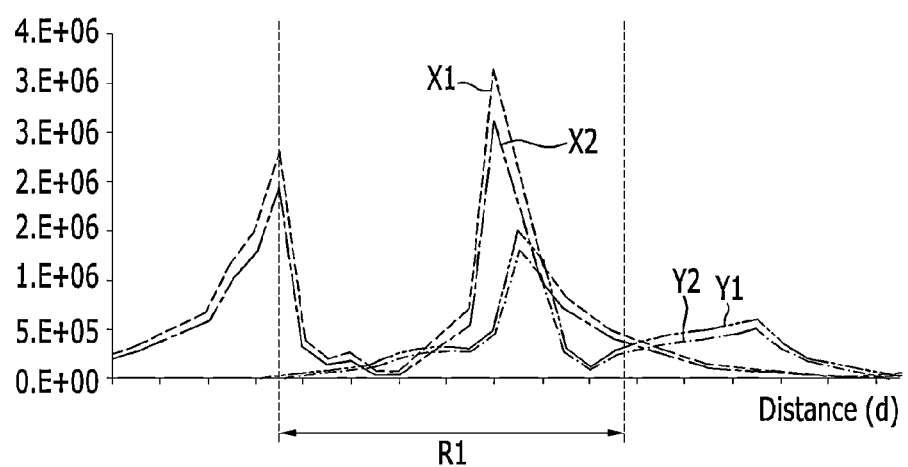
FIG. 5A includes graphs that illustrate experimental results related to two liquid crystal displays.

FIG. 5A includes graphs that illustrate experimental results related to a first liquid crystal display and a second liquid crystal display. In the first liquid crystal display, as a conventional liquid crystal display, an edge of a first field-generating electrode (e.g., a pixel electrode) may be disposed outside cutouts of a second field-generating electrode (e.g., a common electrode) in a plan view of the liquid crystal display. In the second liquid crystal display, as a liquid crystal display according to an embodiment of the present invention, an edge of a first field-generating electrode (e.g., a pixel electrode) may be exposed by edge portions of cutouts of a second field-generating electrode (e.g., a common electrode) in a plan view of the liquid crystal display.

In FIG. 5A, each value in the horizontal axis may represent a distance d measured from a point in a stem portion of a cutout of a second field-generating electrode (e.g., a common electrode) toward an edge of a pixel area. The point may be on an edge of the part A indicated in FIG. 1. Each value in the vertical axis may represent a fringe field intensity deviation from a predetermined value (associated with a main liquid crystal molecule alignment direction) at a particular distance away from the point (or from the edge of the part A).

In FIG. 5A, graphs X1 and X2 represent experimental results associated with the first liquid crystal display. Graphs Y1 and Y2 represent experimental results associated with the second liquid crystal display. Graphs X1 and Y1 represent experimental results associated with experiment conditions in which a voltage difference between the first field-generating electrode and the second field-generating electrode is about 10.3 V. Graphs X2 and Y2 represent experimental results associated with experiment conditions in which a voltage difference between the first field generating electrode and the second field generating electrode is about 11.1 V.

As can be appreciated from FIG. 5A, fringe field intensity deviation associated with the second liquid crystal display may be generally lower than fringe field intensity deviation associated with the first liquid crystal display. Therefore, the second liquid crystal display may provide relatively more consistent light transmittance and more desirable image display quality than the first liquid crystal display.

Figure 5B:
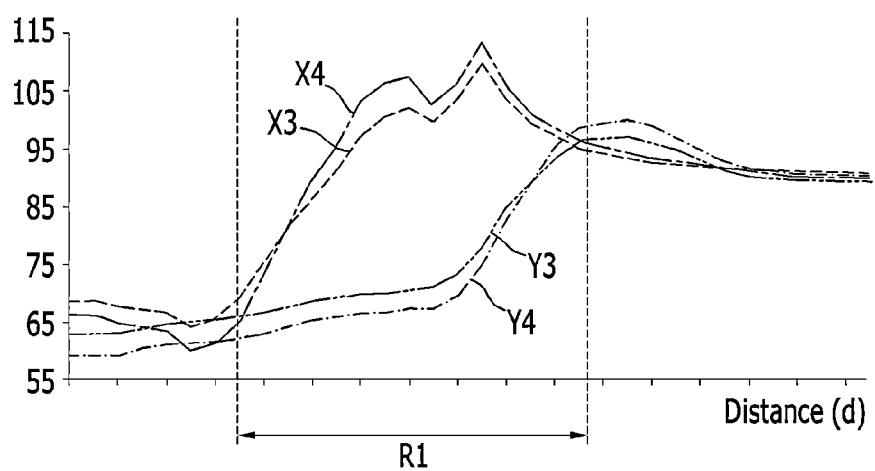
FIG. 5B includes graphs that illustrate experimental results related to two liquid crystal displays.

FIG. 5B includes graphs that illustrate experimental results related to a first liquid crystal display and a second liquid crystal display. In the first liquid crystal display, as a conventional liquid crystal display, an edge of a first field-generating electrode (e.g., a pixel electrode) may be disposed outside cutouts of a second field-generating electrode (e.g., a common electrode) in a plan view of the liquid crystal display. In the second liquid crystal display, as a liquid crystal display according to an embodiment of the present invention, an edge of a first field-generating electrode (e.g., a pixel electrode) may be exposed by edge portions of cutouts of a second field-generating electrode (e.g., a common electrode) in a plan view of the liquid crystal display.

In FIG. 5B, each value in the horizontal axis may represent a distance d measured from a point in a stem portion of a cutout of a second field-generating electrode (e.g., a common electrode) toward an edge of a pixel area. The point may be on an edge of the part A indicated in FIG. 1. Each value in the vertical axis may represent an angular deviation from a pre-tilt direction of liquid crystal molecules at a particular distance away from the point (or from the edge of the part A).

In FIG. 5B, graphs X3 and X4 represent experimental results associated with the first liquid crystal display. Graphs Y3 and Y4 represent experimental results associated with the second liquid crystal display. Graphs X3 and Y3 represent experimental results associated with experiment conditions in which a voltage difference between the first field-generating electrode and the second field-generating electrode is about 10.3 V. Graphs X4 and Y4 represent experimental results associated with experiment conditions in which a voltage difference between the first field generating electrode and the second field generating electrode is about 11.1 V.

As can be appreciated from FIG. 5B, angular deviation of liquid crystal molecules associated with the second liquid crystal display may be generally lower than angular deviation of liquid crystal molecules associated with the first liquid crystal display. Therefore, the second liquid crystal display may provide relatively more consistent light transmittance and more desirable image display quality than the first liquid crystal display.

According to embodiments of the present invention, in a liquid crystal display, an edge of a first field-generating electrode may be exposed by edge portions of cutouts of a second field-generating electrode without substantially overlapping electrode material portions (i.e., branch electrodes) of the second field-generating electrode. Accordingly, overlap between end portions of the second field-generating electrode and the first field-generating electrode may be minimized. Therefore, irregular movement of liquid crystal molecules at the edge portions of the cutouts of the second field-generating electrode may be minimized, such that light transmittance of the liquid crystal display may be maximized, and/or such that light transmittance consistency of the liquid crystal display may be optimized. Advantageously, image display quality of the liquid crystal display may be optimized.

While this invention has been described in connection with what is presently considered to be practical embodiments, it is to be understood that the invention is not limited to the disclosed embodiments. This invention is intended to cover various modifications and equivalent arrangements included within the spirit and scope of the appended claims.

What is claimed is:

1. A liquid crystal display, comprising:
   a first substrate;
   a gate line and a data line formed on the first substrate;
   a first field generating electrode formed on the first substrate;
   an insulating layer formed on the first field generating electrode; and
   a second field generating electrode formed on the insulating layer and having a plurality of cutouts that includes a cutout,
   wherein the cutout includes a first portion extending substantially parallel to the data line and a second portion extending at a first angle with respect to the first portion and extending from the first portion,
   wherein a portion of an edge of the first field generating electrode overlaps the second portion of the cutout,
   wherein the portion of the edge of the first field generating electrode is positioned between the first portion of the cutout and a first edge of the second portion of the cutout in the layout view of the liquid crystal display, and
   wherein a width of the portion of the edge of the first field generating electrode is narrower than a width of the first portion in a direction parallel to the gate line and is wider than a width of the first edge of the second portion in the direction parallel to the gate line, wherein the first edge of the second portion of the cutout extends substantially parallel to the gate line.

2. The liquid crystal display of claim 1, wherein:
   the second portion is disposed at an edge of a pixel area.

3. The liquid crystal display of claim 2, wherein:
the cutout further includes a third portion extending at a second angle with respect to the first portion.

4. The liquid crystal display of claim 3, wherein:
the third portion is disposed at a central portion of the pixel area.

5. The liquid crystal display of claim 4, wherein:
the first field generating electrode has a plate planar shape formed throughout the pixel area.

6. The liquid crystal display of claim 1, wherein:
the cutout further includes a third portion extending at a second angle with respect to the first portion, and
wherein the first angle and the second angle are acute angles and are unequal to each other.

7. The liquid crystal display of claim 6, wherein:
the third portion corresponds to a portion of the data line in a direction parallel to the gate line and is not parallel to the portion of the data line.

8. The liquid crystal display of claim 7, wherein:
the portion of the data line extends parallel to the first portion of the cutout.

9. The liquid crystal display of claim 1, wherein:
each of two opposite edges of the first field generating electrode crosses the plurality of cutouts in the layout view of the liquid crystal display.

10. A display device comprising:
a first field-generating electrode; and
a second field-generating electrode overlapping the first field-generating electrode and having a cutout,
wherein a first edge of the first field-generating electrode and a second edge of the first field-generating electrode are opposite each other and are positioned between two opposite edges of the cutout in a layout view of the display device, wherein a portion of the second edge of the first field-generating electrode extends from a first boundary of the cutout to a second boundary of the cutout in the layout view of the display device, and wherein the first boundary of the cutout is not parallel to the second boundary of the cutout.

11. The display device of claim 10, wherein a portion of the first edge of the first field-generating electrode is positioned between two trapezoid portions of the cutout in the layout view of the display device.

12. The display device of claim 10,
wherein the second field-generating electrode includes a first branch electrode and a second branch electrode,
wherein the cutout is positioned between the first branch electrode and the second branch electrode, and
wherein a portion of the first edge of the first field-generating electrode is positioned between the first branch electrode and the second branch electrode in the layout view of the display device.

13. The display device of claim 10, wherein both a portion of the first edge of the first field-generating electrode and the portion of the second edge of the first field-generating electrode are positioned between the two opposite edges of the cutout in the layout view of the display device.

14. The display device of claim 10, further comprising: a data line configured to transmit a data signal,
wherein the cutout includes a first portion and a second portion,
wherein the first portion of the cutout extends parallel to a portion of the data line,
wherein the second portion of the cutout extends at a first acute angle with respect to the first portion of the cutout, and
wherein a portion of the first edge of the first field-generating electrode is positioned at the second portion of the cutout in the layout view of the display device.

15. The display device of claim 14, further comprising: a gate line configured to transmit a gate signal, wherein the second portion of the cutout is disposed at an edge portion of a pixel area that is defined by the data line and the gate line.

16. The display device of claim 10,
wherein the second field-generating electrode has a plurality of cutouts, and
wherein portions of the first edge of the first field-generating electrode are positioned at the cutouts in the layout view of the display device.

17. The display device of claim 16,
wherein the cutouts are positioned between branch electrodes of the second field-generating electrode in the layout view of the display device, and
wherein the first edge of the first field-generating electrode overlaps the branch electrodes.

18. A liquid crystal display, comprising:
a first substrate;
a gate line and a data line formed on the first substrate;
a first field generating electrode formed on the first substrate;
an insulating layer formed on the first field generating electrode; and
a second field generating electrode formed on the insulating layer and having a plurality of cutouts,
wherein the cutouts include a plurality of first portions extending substantially parallel to the data line and include a plurality of second portions extending at a first angle with respect to the first portions and extending from the first portions, and
wherein an edge of the first field generating electrode extending substantially parallel to the gate line overlaps all the second portions adjacent to the gate line of the cutouts.

19. The liquid crystal display of claim 18, wherein:
the cutouts further include a third portion extending at a second angle with respect to the first portion, respectively.

20. The liquid crystal display of claim 19, wherein:
the second portion is disposed at an edge of a pixel area and the third portion is disposed at a central portion of the pixel area.

* * * * *